(12) United States Patent
Zhao et al.

(10) Patent No.: US 12,530,407 B2
(45) Date of Patent: Jan. 20, 2026

(54) DATA FILTERING METHODS AND APPARATUSES FOR DATA QUERIES

(71) Applicant: Beijing OceanBase Technology Co., Ltd., Beijing (CN)

(72) Inventors: Saitong Zhao, Beijing (CN); Hui Cao, Beijing (CN); Yuzhong Zhao, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/483,087

(22) Filed: Oct. 9, 2023

(65) Prior Publication Data

US 2024/0126818 A1    Apr. 18, 2024

(30) Foreign Application Priority Data

Oct. 18, 2022    (CN) .......................... 202211273807.3

(51) Int. Cl.
*G06F 16/90* (2019.01)
*G06F 16/9035* (2019.01)

(52) U.S. Cl.
CPC ............................... *G06F 16/9035* (2019.01)

(58) Field of Classification Search
CPC .................................................. G06F 16/9035
See application file for complete search history.

(56) References Cited

U.S. PATENT DOCUMENTS

| 2017/0103103 A1* | 4/2017 | Nixon | G06F 16/2452 |
| 2017/0116136 A1* | 4/2017 | Macnicol | G06F 16/2255 |
| 2018/0268080 A1* | 9/2018 | Christian | G06F 17/18 |
| 2019/0266193 A1* | 8/2019 | Wang | G06F 16/9014 |
| 2019/0279133 A1* | 9/2019 | Gao | G06Q 10/063118 |
| 2020/0293549 A1* | 9/2020 | Wang | H04L 67/1095 |
| 2021/0073696 A1* | 3/2021 | Gao | G06N 20/00 |
| 2021/0311943 A1* | 10/2021 | Kondiles | G06F 16/24537 |
| 2022/0046248 A1* | 2/2022 | Sugie | H04N 19/186 |
| 2022/0215021 A1* | 7/2022 | Shan | G06F 16/283 |

(Continued)

OTHER PUBLICATIONS databricks.com [online], "Photon," retrieved on Feb. 12, 2025, retrieved from URL<https://www.databricks.com/product/photon>, 9 pages.

(Continued)

*Primary Examiner* — Mohammad S Rostami (74) *Attorney, Agent, or Firm* — Fish & Richardson P.C.

(57) ABSTRACT

Embodiments of this specification provide data filtering methods, computer-readable media and apparatuses for data queries. The filtering methods can be performed by a target device that serves as a storage node of a database. As an example, a target filtering operator involved in a query is determined. A target data block stored in the target device is obtained. Further, a pre-built operator function set is queried by using a data feature and an encoding feature of the target data block to obtain a target execution function of the target filtering operator. The operator function set is used to record filtering operator execution functions that are suitable for use and that correspond to various data types and various encoding manners. The target data block can be filtered by using the target execution function matched by the query to obtain a filtering result.

19 Claims, 5 Drawing Sheets

(56) References Cited

U.S. PATENT DOCUMENTS

2023/0076123 A1\* 3/2023 Nakadai ................ H04R 3/005
2024/0054103 A1\* 2/2024 Bhola .................... G06F 16/13

OTHER PUBLICATIONS docs.pingcap.com [online], "TiFlash Overview," retrieved on Feb. 12, 2025, retrieved from URL<https://docs.pingcap.com/tidb/stable/tiflash-overview>, 5 pages.

python.langchain.com [online], "SingleStoreDB," retrieved on Feb. 12, 2025, retrieved from URL<https://python.langchain.com/docs/integrations/vectorstores/singlestoredb/>, 8 pages.

support.kaspersky.com [online], "Selective Scan," retrieved on Feb. 12, 2025, retrieved from URL<https://support.kaspersky.com/KAV/2021/en-US/70905.htm>, 1 page.

yandex.com [online], "ClickHouse," retrieved on Feb. 12, 2025, retrieved from URL<https://yandex.com/dev/clickhouse/>, 3 pages.

aws.amazon.com [online], "AWS Redshift," retrieved on Feb 12, 2025, retrieved from URL<https://aws.amazon.com/pm/redshift/?trk=a136dbb3-Ff50-468b-9a66-852dc1ca985b&sc_channel=ps&ef_id=Cj0KCQjwONPGBhCDARIsAGAzpp3DWSqcXrgojXpxhuyNH7zTborwpn2KUuDwumHyL938TMD6LG0V0m4aApnvEALw_wcB:G:s&skwcid=AL!4422!3!651751058853!e!!g!!amazon%20redshift!19852662155!.

\* cited by examiner

DATA FILTERING METHODS AND APPARATUSES FOR DATA QUERIES

CROSS-REFERENCE TO RELATED APPLICATIONS

This application claims priority to Chinese Patent Application No. 202211273807.3, filed on Oct. 18, 2022, which is hereby incorporated by reference in its entirety.

TECHNICAL FIELD

One or more embodiments of this specification relate to the field of database queries, and in particular, to data filtering methods and apparatuses for data queries.

BACKGROUND

The development of the Internet generates a need for massive data storage. Massive data can include personal data, privacy data, and the like of tenants or users. The data are usually stored in a database cluster in a form of a data table. To store and manage the data efficiently, currently, multiple types of mainstream databases employ a log structured merge (LSM) storage mode, and implement data storage by combining incremental log writing and multi-level log data. In this architecture, a sorted-string table (SSTable) data structure is generally used for persistent storage of data. Data are sorted based on SSTable according to primary keys so as to provide ordered data storage, indexing, and query services.

With the advancement of digitalization processes, an amount of data stored in a database system keeps growing, and needs for real-time analysis and queries of massive data increase accordingly. Databases need to provide a static data scanning capability with good performance to efficiently support analytical loads.

Predicate pushdown is a common method for optimizing filtering and scanning (selective scan) performance of massive data. Specifically, in some data query systems, some filtering operators that can reduce a size of an intermediate result set are pushed down to lower layers of an execution link to perform computing without affecting a final result set, thereby reducing a data amount in subsequent processing and accelerating a query process. Some mainstream databases implement a more efficient SSTable scanning speed by pushing a filtering operator down to a storage layer.

However, data are generally stored after being compressed and encoded. Therefore, to push the filtering operator down to the storage layer for preliminary data filtering and scanning, a data encoding and decoding problem has to be considered. Handling of this problem often becomes a bottleneck in query execution.

An improved solution is desired to optimize a filtering and scanning process of encoded data so as to accelerate data query execution and improve database performance.

SUMMARY

In view of the above-mentioned problem, this specification provides data filtering methods and apparatuses for data queries, so that a filtering operator execution function applicable to a current data block can be determined during data scanning and filtering, and data in an encoded state are filtered by using the function, thereby effectively facilitating predicate pushdown and improving data query efficiency.

According to a first aspect, a data filtering method for data queries is provided and is executed by a target device, where the target device serves as a storage node of a database, and the method includes the following: determining a target filtering operator involved in a query; obtaining an encoded target data block stored in the target device; querying a pre-built operator function set by using a data feature and an encoding feature of the target data block to obtain a target execution function of the target filtering operator; and filtering the target data block by using the target execution function to obtain a first filtering result.

According to an implementation, the operator function set is a function set customized based on a hardware platform and a running environment of the target device.

In an embodiment of the above-mentioned implementation, the operator function set is specifically obtained in the following way: obtaining a basic function set, where the basic function set is a function set that is generated in a compilation phase of a database program and that is applicable to multiple types of hardware platforms; in a process of running the database program, obtaining an optimization function set based on the running environment, where the optimization function set is an additional function set compiled based on a compilation environment in the compilation phase, and includes optimization execution functions of several functions in the basic function set; and adding the optimization function set to the basic function set to obtain the operator function set.

In an embodiment, the operator function set specifically includes a function matrix that has multiple dimensions and that corresponds to the target filtering operator; and the multiple dimensions include several dimensions corresponding to the data feature and several dimensions corresponding to the encoding feature. In this case, a query process of the operator function set can include the following: determining an index value of each of the multiple dimensions based on the data feature and the encoding feature; and determining a corresponding operator function from the function matrix based on the index value of each dimension as the target execution function.

In another embodiment, the operator function set specifically includes multiple sub-function matrices corresponding to multiple meta operations. In this case, a query process of the operator function set can include the following: determining, from the multiple sub-function matrices, several target sub-function matrices corresponding to several target meta operations involved in the target filtering operator; querying each target sub-function matrix based on the data feature and the encoding feature to obtain several target sub-functions; and determining the target execution function based on a combination of the several target sub-functions.

In a specific embodiment, the data feature can include several items in the following: a data type, a data length, and a metadata type; and the encoding feature can include an encoding manner and an auxiliary feature corresponding to the encoding manner.

Further, when the encoding manner includes bitwise data alignment, the auxiliary feature includes an alignment bit width; or when the encoding manner includes encoding assisted by a dictionary, the auxiliary feature includes a related feature of the dictionary.

In an embodiment, the target data block is a data block in hybrid row/column-oriented storage; the first filtering result indicates a target data row obtained by filtering; and the method further includes the following: obtaining a target data column in an execution plan corresponding to the query; determining a target data range by using the target data row and the target data column; and decoding data in the target data range.

In an example, the first filtering result is in a form of a result bitmap, and the result bitmap indicates, separately by using a first value and a second value, whether a bit belongs to a filtering result.

According to an implementation, the target device has a vector register supporting single instruction, multiple data streams SIMD; and the target execution function includes an optimization operation for the SIMD, and the optimization operation includes organizing data based on a vector length of the vector register, and processing the organized data based on the vector register by using an instruction set corresponding to the hardware platform.

In an implementation, the target filtering operator relates to a comparison operation; an encoding manner of the target data block is performed based on a dictionary; and an execution path of the target execution function includes the following: searching a dictionary reference table of the dictionary for a reference word corresponding to a target value of the comparison operation; and in the dictionary reference table, performing comparison processing on an encoding word in the target data block and the reference word.

In an example of the above-mentioned implementation, the target filtering operator includes a comparison operator, an IN operator, or a between operator.

In an example of the above-mentioned implementation, the target device has a vector register supporting single instruction, multiple data streams SIMD; and the comparison processing includes the following: performing parallel comparison processing in the dictionary reference table by using the SIMD.

According to a second aspect, a data filtering apparatus for data queries is provided, and is deployed in a target device, where the target device serves as a storage node of a database, and the apparatus includes the following: an operator determining unit, configured to determine a target filtering operator involved in a query; a data block acquisition unit, configured to obtain an encoded target data block stored in the target device; a function query unit, configured to query a pre-built operator function set by using a data feature and an encoding feature of the target data block to obtain a target execution function of the target filtering operator; and a filtering unit, configured to filter the target data block by using the target execution function to obtain a first filtering result.

According to a third aspect, a computer-readable storage medium is provided. The computer-readable storage medium stores a computer program. When the computer program is executed by a computer, the computer is enabled to perform the method according to the first aspect.

According to a fourth aspect, a computing device is provided, including a memory and a processor. The memory stores executable code, and when executing the executable code, the processor implements the method according to the first aspect.

In the embodiments of this specification, more optimal execution functions corresponding to various encoding features and data features can be designed in advance based on research on various encoding manners and various data structure characteristics, so as to design an operator function set. In a data query execution process, the operator function set is queried based on a current encoding feature and data feature, and an execution function preferred in a current environment can be matched. In particular, when a hardware platform supports single instruction, multiple data streams SIMD computing, the execution function can employ an optimized SIMD execution manner for the current hardware platform. In the above-mentioned manner, before data at a storage layer is decoded, effective filtering of the data can be implemented to reduce an amount of data that needs to be decoded, and also reduce an amount of data in an intermediate result set, thereby improving overall query efficiency.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can derive other drawings from these accompanying drawings without creative efforts.

DESCRIPTION OF EMBODIMENTS

The following describes the solutions provided in this specification with reference to the accompanying drawings.

As described above, to accelerate data queries, some databases push a filtering operator down to a storage layer for preliminary data filtering and scanning. In this process, a data encoding and decoding problem needs to be considered.

In a related solution, an encoding manner of columns is specified when a data table is stored. Because the encoding manner of columns is determined, a filtering scheme corresponding to the encoding manner can be selected when scanning starts, and the filtering scheme can be performed based on encoded data. However, in such a solution in which an encoding manner is bound to a metadata schema (which can limit each column), a database cannot flexibly select a more suitable encoding manner based on a data feature for storage, compromising a data compression capability to some extent. After the encoding manner is fixed, actual data may trigger a bad case (a poor performance case) corresponding to an encoding algorithm, affecting compression and query performance.

In another related solution, when a data table is stored, adaptive encoding is used based on data characteristics, but encoded data are not perceived during queries. Scanning and filtering operators of data are both operated on a decoded result set. In other words, data in a stored data block are first decoded, and then scanned and filtered. In such a solution, a data encoding module is decoupled from a query execution module, but all data in a data block involved in scanning need to be deserialized/decoded. A decoding process easily becomes a performance bottleneck in query execution.

In still another related solution, an adaptive encoding manner is used based on data characteristics to encode and store a data block. During data queries, filtering optimization is performed with respect to data features, and execution paths for decoding and scanning are determined by using a large quantity of conditional branches. In adaptive encoding with a certain difference between data features, this solution easily triggers CPU branch prediction failures during execution, destroying an instruction execution pipeline. In particular, frequently introducing branch prediction failures leads to significant performance degradation during more optimal vectorization execution in queries with a large data amount.

In another aspect, to accelerate data queries and data filtering, optimization is considered from a perspective of improving hardware performance of a database storage device. Due to a limitation of Moore's law, dominant-frequency increase of a CPU is limited in recent years. Some hardware platforms provide vector registers to improve data processing efficiency by performing single instruction, multiple data streams SIMD operations. In SIMD, multiple pieces of data are stored in a vector register, and a unified control signal is used to control the multiple pieces of data in the vector register for unified and parallel computing. As such, a data processing speed is increased.

Recently, hardware vendors have been trying to provide a better SIMD capability for CPUs by providing vector registers with larger bit widths and higher performance, so as to enhance computing performance. However, use of vector registers is limited to some extent. Software and algorithms need to be reconstructed accordingly, and optimization needs to be performed with reference to an entire computing process to achieve an ideal effect. In predicate pushdown scenarios, to perform acceleration by using an SIMD mode, a specific filtering operator needs to be optimized with reference to a hardware capability and an instruction set that are provided by a hardware vendor. However, hardware configurations and instruction sets provided by different hardware vendors are often different. As a result, it is difficult for database software to accelerate queries by using the SIMD capability, or the database software cannot be applicable to different platforms, which causes a cross-platform compatibility problem.

In view of the above-mentioned considerations, some embodiments of this specification provide a data filtering solution. In the solution, for adaptively encoded data, filtering and scanning can be performed on a data block by using a filtering execution function suitable for a hardware platform and data characteristics so as to accelerate data queries.

Figure 1:
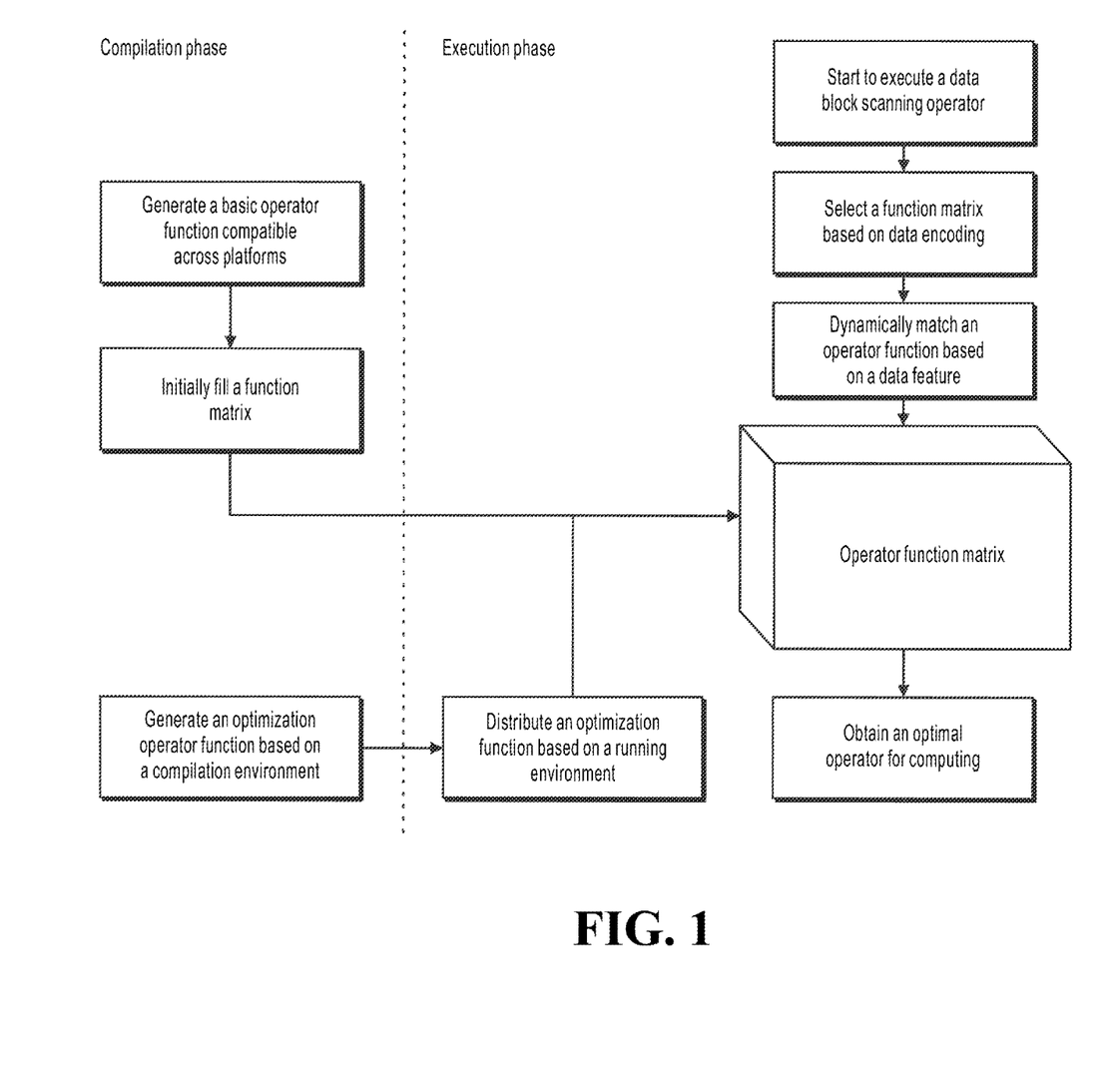
FIG. 1 is a schematic diagram illustrating an implementation process according to some embodiments.

FIG. 1 is a schematic diagram illustrating an implementation process according to some embodiments. An overall implementation process can be divided into a compilation phase and an execution phase.

In a conventional database enabling process, a target device having storage and computing capabilities compiles code of a database program to generate an executable file. Then, the target device runs the executable file, that is, runs the database program. In this case, the target device serves as a storage node of a database, and can execute storage and query functions corresponding to the storage node of the database.

On the basis of the above-mentioned conventional process, according to the embodiments shown in FIG. 1, when the database program is compiled, an operator function set is further generated. The operator function set records filtering operator execution functions that are suitable for use and that correspond to various data types and various encoding manners. Typically, the operator function set can be organized into an operator function matrix to show correspondences between operator execution functions and various data features and encoding features. The target device stores the operator function matrix, and loads the operator function matrix during running of the database program for subsequent query execution.

In particular, in some embodiments, the database employs an adaptive encoding manner. To be specific, different encoding manners are dynamically used based on different characteristics of real data to perform encoding and store encoded data. Correspondingly, the database program includes logic code for adaptive encoding on data. The operator function matrix can be designed and constructed based on the logic code for adaptive encoding.

Further, to enable the database program to have cross-platform compatibility, SIMD capabilities of some hardware platforms can be utilized. In some embodiments, for some filtering operators that can be optimized by using SIMD, different hardware indicators and vectorization instruction sets provided by different hardware vendors can be used to design multiple editions of implementation functions. In the compilation phase, a basic operator function matrix that is compatible across platforms is first generated. Operator execution functions in the basic operator function matrix are suitable for various platforms. In addition, in a compilation process, a compilation environment is checked, and some hardware configuration information of the target device can be indicated in the compilation environment. Then, an optimization operator function of a corresponding edition is compiled based on the compilation environment. When the target device runs the database program, an available optimization function edition is determined by using a running environment, and added to the basic operator function matrix to obtain a final operator function matrix. As such, the operator function matrix stored in the target device serving as the storage node is an operator function set adapted to a hardware platform of the target device, and the above-mentioned database program can still be universally applicable to multiple different platforms.

After the target device runs the database program, the target device serves as a storage node in a database system, and can execute data storage and query functions. In particular, the target device can accelerate a data query process by using the above-mentioned operator function matrix.

Specifically, in the query execution phase, the target device (serving as a storage node) obtains an encoded data block based on a current query request, and scans and filters the encoded data block based on a filtering operator involved in the query. Typically, the query request is, for example, an SQL query statement. To accelerate scanning and filtering, the target device performs query and matching in the previously loaded operator function matrix based on a data feature and an encoding feature of the data block, so as to obtain an optimization execution function of the filtering operator. Therefore, the target device can filter data in an encoded form by using the optimization execution function.

It can be understood that, the operator function matrix is designed in advance based on encoding logic of the database program, and the operator function matrix records filtering operator execution functions that are suitable for use for various data types and various encoding manners. In addition, in some embodiments, the operator function matrix is further a function matrix optimized for the hardware platform of the target device. Therefore, an optimization execution function obtained by querying the operator function matrix based on a data feature and an encoding feature of a current data block is definitely an execution function suitable for hardware characteristics of the target device and data characteristics and encoding characteristics of the current data block. By using such an execution function, the data block can be scanned and filtered more quickly and accurately, so that an amount of data that needs to be subsequently decoded is reduced, and a filtering operation is pushed down to before decoding.

The following describes in detail an implementation in a data query phase.

Figure 2:
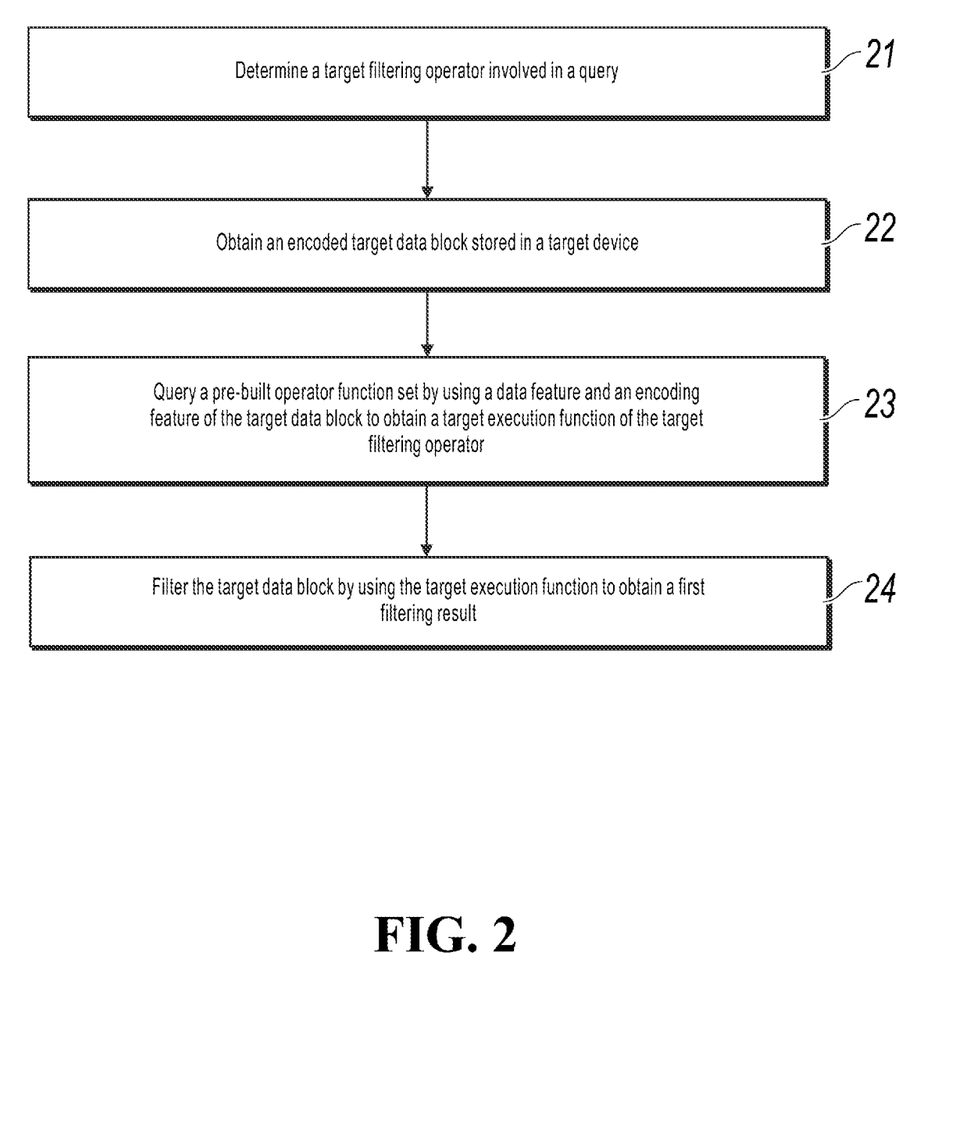
FIG. 2 is a flowchart illustrating a data filtering method according to some embodiments.

FIG. 2 is a flowchart illustrating a data filtering method according to some embodiments, where data filtering is used to accelerate or optimize data queries. The method is executed by a target device, and the target device runs a database program and serves as a storage node of a database. The target device can be specifically embodied as any computing unit, server, computer device, or the like that has computing, storage, and processing capabilities. As shown in FIG. 2, the data filtering method can include the following specifically described steps.

In step 21, a target filtering operator involved in a query is determined. The target filtering operator here is an operator that is determined based on a query request and that can be pushed down to a storage layer. The query request can be, for example, in a form of an SQL query statement. In a typical query execution process, filtering operators that may be pushed down to the storage layer can include a comparison operator, an IN operator, a between operator, a null operator, and the like.

Specifically, in an example, a query condition involved in the query request includes a comparison between a field value of a certain field and a specified value. For example, a target table of a query can be a performance score table that includes multiple courses, and one query condition in the query request is as follows: A mathematics performance score is greater than or equal to 80. In this case, it can be determined that the target filtering operator involved in the query includes a comparison operator. In a case with another query condition, another operator may be involved as the target filtering operator.

In step 22, an encoded target data block stored in the target device is obtained. It can be understood that in a database system, data in a data table are generally split into data blocks and stored in a persistent storage medium. For example, in a certain mainstream database system, a data block has a size of about 2 MB, and includes multiple data items in a form of key-value pair (k,v). In addition, in an S Stable data format, data items are stored in order of sizes of primary keys. The target data block here can be any data block in a to-be-queried target data table (for example, the above-mentioned performance score table). It should be emphasized that a data item in the target data block is in an encoded state.

It should be noted that the steps 21 and 22 above can be performed in any reasonable order, which is not limited here.

In an embodiment, the database program running on the target device encodes and stores data in an adaptive encoding manner. In this case, different data tables and different data blocks stored at the storage layer may be encoded in different encoding manners. As such, based on the above-mentioned acquisition of the target data block, a data feature and an encoding feature of the target data block can be further extracted.

Further, in step 23, a pre-built operator function set is queried by using the data feature and the encoding feature of the target data block to obtain an execution function corresponding to the data feature and the encoding feature as a target execution function of the target filtering operator.

According to an implementation, the operator function set is generated in a compilation phase of the database program (shown in FIG. 1), and records filtering operator execution functions that are suitable for use and that correspond to various data types and various encoding manners. In an embodiment, the operator function set can be organized into an operator function matrix to show correspondences between operator execution functions and various data features and encoding features.

According to an implementation, the operator function set is a function set customized based on a hardware platform and a running environment of the target device. In this case, the operator function set can be obtained in the following way: In the compilation phase, the target device obtains a basic function set, where the basic function set is a function set that is generated in the compilation phase of the database program and that is applicable to multiple types of hardware platforms. In a process in which the target device runs the database program, an optimization function set is obtained based on the running environment, where the optimization function set is a function set compiled based on a compilation environment in the compilation phase, and includes optimization execution functions of several functions in the basic function set. Therefore, the target device can add the optimization function set to the basic function set to obtain a final operator function set. In this case, the operator function set is a function set adapted to the hardware platform and the running environment of the target device.

It can be understood that the operator function set needs to record filtering operator execution functions that are suitable for use and that correspond to various data types and various encoding manners. Therefore, the operator function set can be organized and designed based on encoding logic in the database program in consideration of characteristics of various data types and encoding manners. The following describes several operator execution functions by using examples.

In data encoding, redundancy is usually reduced by bitwise data alignment for bitpacking. When a data block has the same quantity of aligned bits, execution paths of corresponding execution functions can include more efficient data restoration (unpacking) on data with different bit widths by branchless programming, iterative expansion, and SIMD. In practice, bitpacking is usually used in combination with other encoding manners. Therefore, a function in each step in the above-mentioned execution path can be embodied based on a feature (for example, whether bitpacking has been performed) of an encoding manner and an auxiliary feature (an alignment bit width value in case that bitpacking has been performed) corresponding to the encoding manner in combination with data features. These data features can include, for example, a type of column data, a type of metadata, whether data have a fixed length or a variable length, and the like.

For encoding manners that can help accelerate filtering and scanning in some data structures, an optimization execution function can also be specifically designed. For example, dictionary encoding and run-length encoding both involve use of a dictionary. For such encoding manners, an execution path of a corresponding execution function can include locating a filtering boundary through binary search on an ordered dictionary, and subsequently performing a batch operation by directly using dictionary reference with a more optimal pair alignment manner and a smaller bit width to generate a filtering result.

When most of data in a data block are the same, a constant encoding manner can be used, where only high-base data are stored as a constant, and other data and corresponding row indexes are additionally stored. For such an encoding manner, a usable execution path can include comparing constant data to filter out most data in a data block.

Delta encoding is also a commonly used encoding manner, which is applicable to a numeric data type with a small range. According to the encoding manner, only minimum data and a difference between each row and the minimum data are stored. For such an encoding manner, a usable execution path includes computing differences between filtered data, and then comparing the differences to implement filtering.

In the above-mentioned method, when operations such as dictionary reference comparison and difference comparison are performed, SIMD can be further used to perform further optimization. A smaller bit width of encoded data enables more data to be filled in vector registers of a CPU at one time, thereby providing higher computing efficiency.

As such, for each type of filtering operator, different filtering execution functions can be designed based on different encoding manners, different data features, and different optional hardware configurations (for example, bit widths of vector registers), and the filtering execution functions are organized into an operator function set.

In an embodiment, the operator function set can be represented as an operator function matrix arranged for each type of filtering operator. The operator function matrix is a matrix with n dimensions, and the n dimensions correspond to various factors based on which various filtering execution functions are designed, including data features, encoding features, and the like. More specifically, the data features can include, for example, a data type (a Boolean type, a numeric type, a string, or the like, where the numeric type can be further classified into an integer type, a float type, or the like), a data length, and a metadata type; and the encoding features can include an encoding manner and an auxiliary feature corresponding to the encoding manner. For example, when the encoding manner includes bitwise data alignment, the auxiliary feature includes an alignment bit width; or when the encoding manner includes encoding assisted by a dictionary, the auxiliary feature includes a related feature of the dictionary. Because different filtering operators have different filtering targets, corresponding operator function matrices may have different dimensions.

In a specific example, a filtering operator execution function in an operator function matrix with n dimensions can be expressed as $A(I_1, I_2, \ldots, I_n)=f$, where $I_1, I_2, \ldots, I_n$ are respective indexes of the n dimensions, and f is a specific function expression. For example, $I_1$ corresponds to a feature item with a fixed length or a variable length in a data feature, and a value range is 0 (indicating a variable length) or 1 (indicating a fixed length). $I_2$ corresponds to an encoding manner, and a value is a serial number of the encoding manner, or the like.

When an operator function set is represented as an operator function matrix, a process of querying the operator function set in step 23 can include determining a target function matrix corresponding to the target filtering operator, for example, when the target filtering operator is a comparison operator, determining a function matrix corresponding to the comparison operator. Further, an index value of each dimension of the matrix is determined based on the data feature and the encoding feature of the target data block. For example, in a case of the operator function matrix with n dimensions, a value is assigned to each of the indexes $I_1, I_2, \ldots, I_n$ based on specific data features and encoding features of the target data block. Therefore, the corresponding operator function is determined from the target function matrix based on the index value of each dimension as the target execution function.

In another embodiment, when an operator function set is constructed, each filtering operator is split into a combination of basic operations, and such basic operations can be referred to as primitive or meta operations. For example, the meta operations can include an operation of reading data in a certain manner; an operation of storing data in a vector register based on a corresponding length; an operation of using a specific control instruction to control a vector register to perform data processing once; and the like. For each meta operation, suitable execution sub-functions for the meta operation in cases of various data features and encoding features are determined to obtain a sub-function matrix corresponding to the meta operation. As such, the operator function set can include multiple sub-function matrices corresponding to multiple meta operations. Depending on a possibility that factors relied on by meta operations are different, dimensions of sub-function matrices can be the same or different.

In this case, a process of querying the operator function set in step 23 can include first determining several target meta operations involved in the target filtering operator, that is, splitting the target filtering operator into a combination of several target meta operations. Then, several target sub-function matrices corresponding to the several target meta operations are determined from the multiple sub-function matrices. Target sub-function matrices are queried based on the data feature and the encoding feature of the target data block to obtain several target sub-functions. The target sub-function matrices can also be queried in the above-mentioned manner. To be specific, index values of the target sub-function matrices are determined based on the data feature and the encoding feature, and the queries are performed based on the index values. Therefore, the target execution function can be obtained based on a combination of several target sub-functions obtained by the queries.

After the target execution function is determined, in step 24, the target execution function can be used to filter the target data block to obtain a first filtering result.

In an embodiment, the to-be-queried target data table employs column-oriented encoding. In this case, the target data block is data in a certain to-be-queried target column in the target data table. In this case, the first filtering result corresponds to data that are in the target column and that satisfy the filtering operator. In this case, the first filtering result can be decoded, and data obtained by decoding are returned to a query engine. Or, when another filtering operator exists, further filtering is performed based on the first filtering result.

In another embodiment, the to-be-queried target data table employs hybrid row/column-oriented encoding. In this case, the target data block includes data in multiple rows and multiple columns in the target data table. In this case, the first filtering result indicates a target data row obtained by filtering. Generally, in this case, a target data column in an execution plan corresponding to the current query further needs to be obtained, and a target data range is determined by using the target data row and the quantity data column. In other words, the target data range is data that belong to both the target data column and the target data row. Then, the data in the target data range can be decoded, for example, batch decoded, and data obtained by decoding are returned to the query engine. Or, when another filtering operator exists, further filtering is performed based on the target range.

According to an implementation, the first filtering result can be in a form of a result bitmap, and the result bitmap indicates, separately by using a first value and a second value, whether a bit belongs to a filtering result. Typically, in the result bitmap, 1 indicates a hit (belonging to a filtering result) and 0 indicates a miss (not belonging to a filtering result). For example, in a case of hybrid row/column-oriented encoding, a quantity of bits in the result bitmap can correspond to a quantity of rows; and values of bits corresponding to target data rows obtained by filtering are set to 1s, and values of other bits are 0s. As such, a filtering result can be intuitively indicated.

The following describes a specific example of executing the above-mentioned solution in a specific encoding manner.

Figure 3:
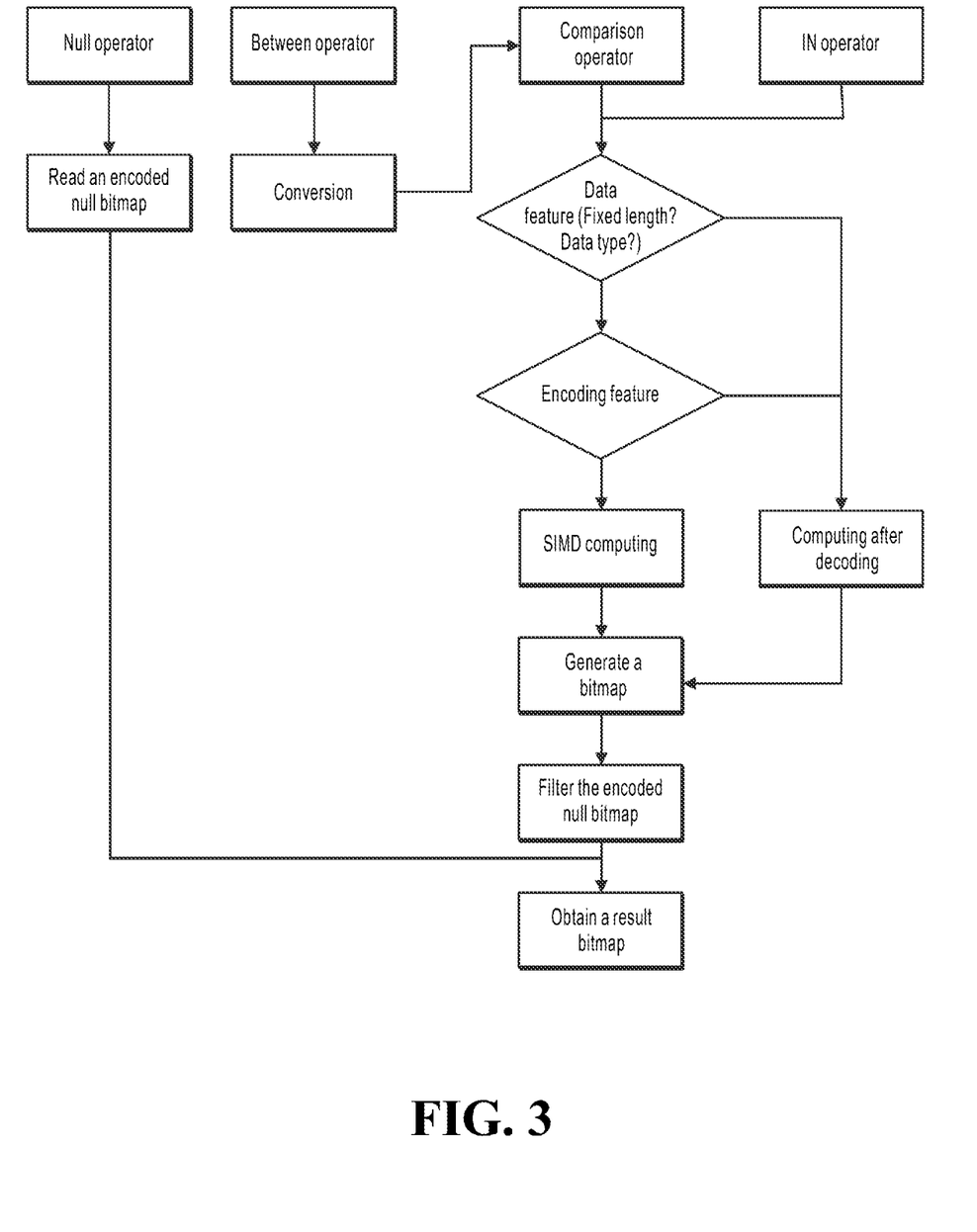
FIG. 3 shows a specific example of a data filtering process in column-oriented encoding.

FIG. 3 shows a specific example of a data filtering process in column-oriented encoding. It should be noted that, it is assumed here that a hardware platform of a target device that executes the data filtering process has a vector register supporting SIMD.

In FIG. 3, the target device first determines a target filtering operator, which can be a comparison operator, a between operator, or an IN operator. The between operator can be converted into a comparison operator (for example, superposition of two comparisons). An execution process of the IN operator is similar to an execution process of the comparison operator. Therefore, a subsequent execution process uses the comparison operator as an example. Then, data features of a data block are obtained, including a data type (for example, a numeric type, which is further determined as an integer type or a float type) and whether data have a fixed length; and encoding features are further obtained, for example, whether bitpacking is performed in column-oriented encoding, an alignment bit width, whether constant storage or difference storage is used, and the like. Then, the operator function set of the target device is matched based on the information. If no match is found, it indicates that decoding needs to be performed before filtering in a case of the current data features and encoding features. As such, a branch of computing after decoding is executed. If an execution function is matched, the data block is filtered based on the execution function. Specifically, because the target device supports the SIMD, it can be assumed that the matched execution function includes an optimization operation for the SIMD, and the optimization operation is shown as SIMD computing in FIG. 3. The optimization operation can specifically include organizing data based on a vector length (for example, 256 bits) of the vector register, and processing the organized data based on the vector register by using an instruction set corresponding to the hardware platform. For example, multiple groups of data can be combined into a 256-bit vector (padding is performed in case of insufficient bits), which is stored in the register at one time. The multiple groups of data are processed in parallel in a unified manner by using a single instruction. Finally, a result bitmap is obtained, which shows data items obtained by filtering a certain data block in a specified column.

In practice, many databases allow some data items in data tables to be set to null. Correspondingly, in this case, a result of a null operator and a result of a conventional filtering operator further need to be combined. Specifically, an encoded null bitmap (which shows locations corresponding to null) can be read, and the encoded null bitmap is filtered based on the bitmap obtained by using the execution function to obtain a final result bitmap.

Figure 4:
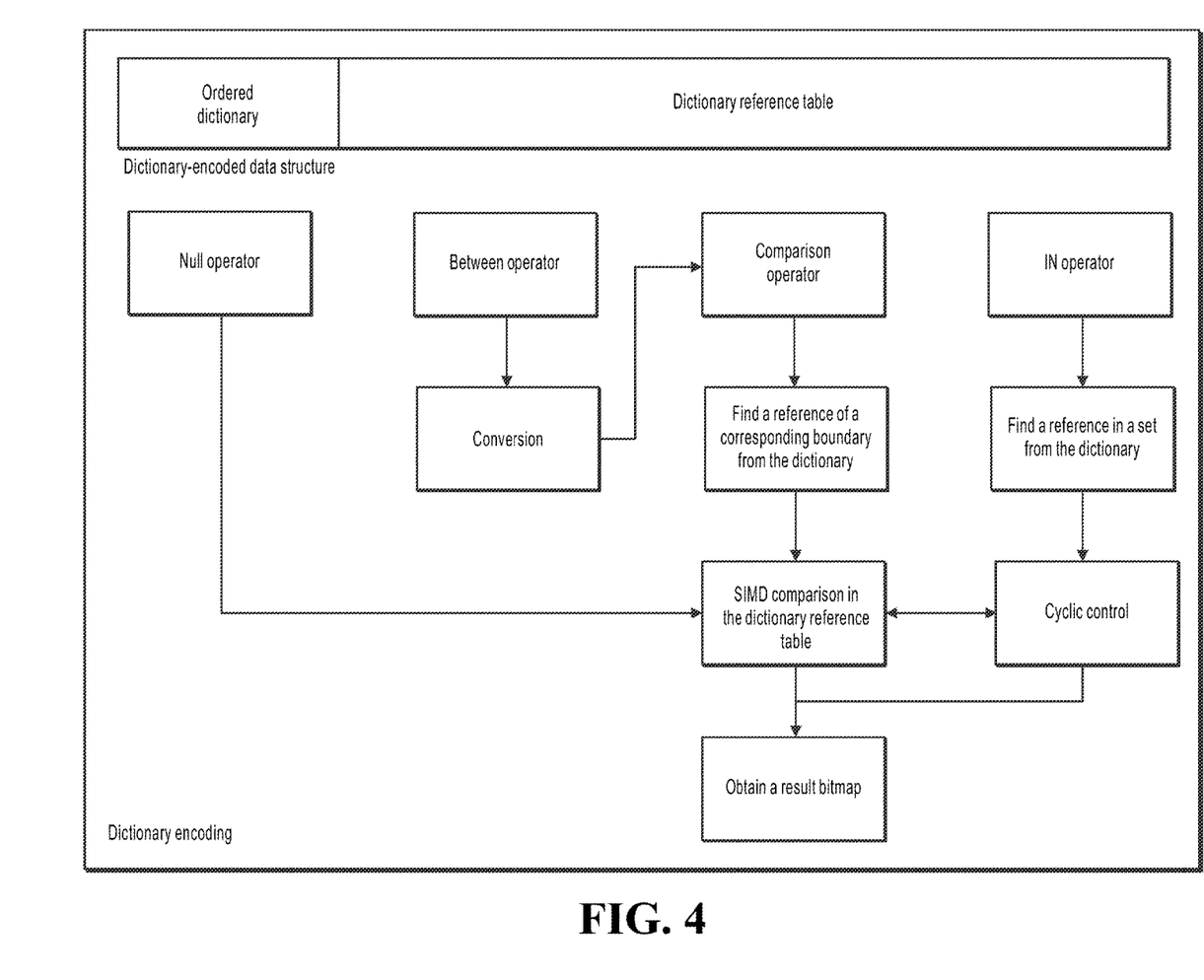
FIG. 4 shows a specific filtering function execution process in an encoding manner using a dictionary.

FIG. 4 shows a specific filtering function execution process in an encoding manner using a dictionary. It is also assumed that the target device that performs the data filtering process supports the SIMD. In addition, it can be understood that the filtering function can be determined by matching the above-mentioned operator function set.

As shown in FIG. 4, because the encoding manner involves use of a dictionary, for example, is dictionary encoding or run-length encoding, information about the dictionary can be obtained in an encoding feature extraction phase, and the information can be an ordered dictionary reference table, which records correspondences between real data and "words" in the dictionary.

The between operator can be converted into a comparison operator. The following describes a filtering function execution process of the comparison operator. For the comparison operator, a boundary value for comparison can be determined, and a reference to the boundary value, that is, a reference word corresponding to the boundary value, can be found from the dictionary reference table. Then, the reference word is compared in the dictionary reference table. When the target device has a vector register, this step can be implemented as performing comparison by using the SIMD in the dictionary reference table, as shown in FIG. 4. To be specific, the SIMD is used to determine a result of comparison between an encoded word obtained by encoding a data item in a data block and the above-mentioned reference word. As such, a result bitmap can be obtained.

The IN operator is used to determine whether a value of data falls into a certain set S. For this, a reference to each value in the set S can be found from the dictionary to obtain multiple reference words. Then, through iterative control, a comparison operation specific to a reference word in the dictionary reference table is obtained by conversion. Specifically, the SIMD can be used to determine a result of comparison between the encoded word in the data block and each of the multiple reference words so as to obtain a result bitmap.

That is, for a filtering operator (a comparison operator, an IN operator, or a between operator) that involves a comparison operation, a reference word corresponding to a target value involved in the comparison can be found from the dictionary reference table, and then the comparison operation is performed on the encoded word in the data block and the reference word, so as to perform data filtering corresponding to the filtering operator. The comparison operation can be optimized by using the SIMD. That is, the SIMD can be used to perform parallel comparison optimization processing in the dictionary reference table, so as to optimize a comparison process.

The operator execution processes for some filtering operators in some encoding manners are described above by using examples. It should be understood that, more optimal execution functions corresponding to various encoding features and data features can be designed based on research on various encoding manners and various data structure characteristics, so as to design an operator function set. In a data query execution process, the operator function set is queried based on a current encoding feature and data feature, and an execution function preferred in a current environment can be matched. As such, before data at the storage layer are decoded, effective filtering of the data can be implemented to reduce an amount of data that needs to be decoded, and also reduce an amount of data in an intermediate result set, thereby improving overall query efficiency.

Figure 5:
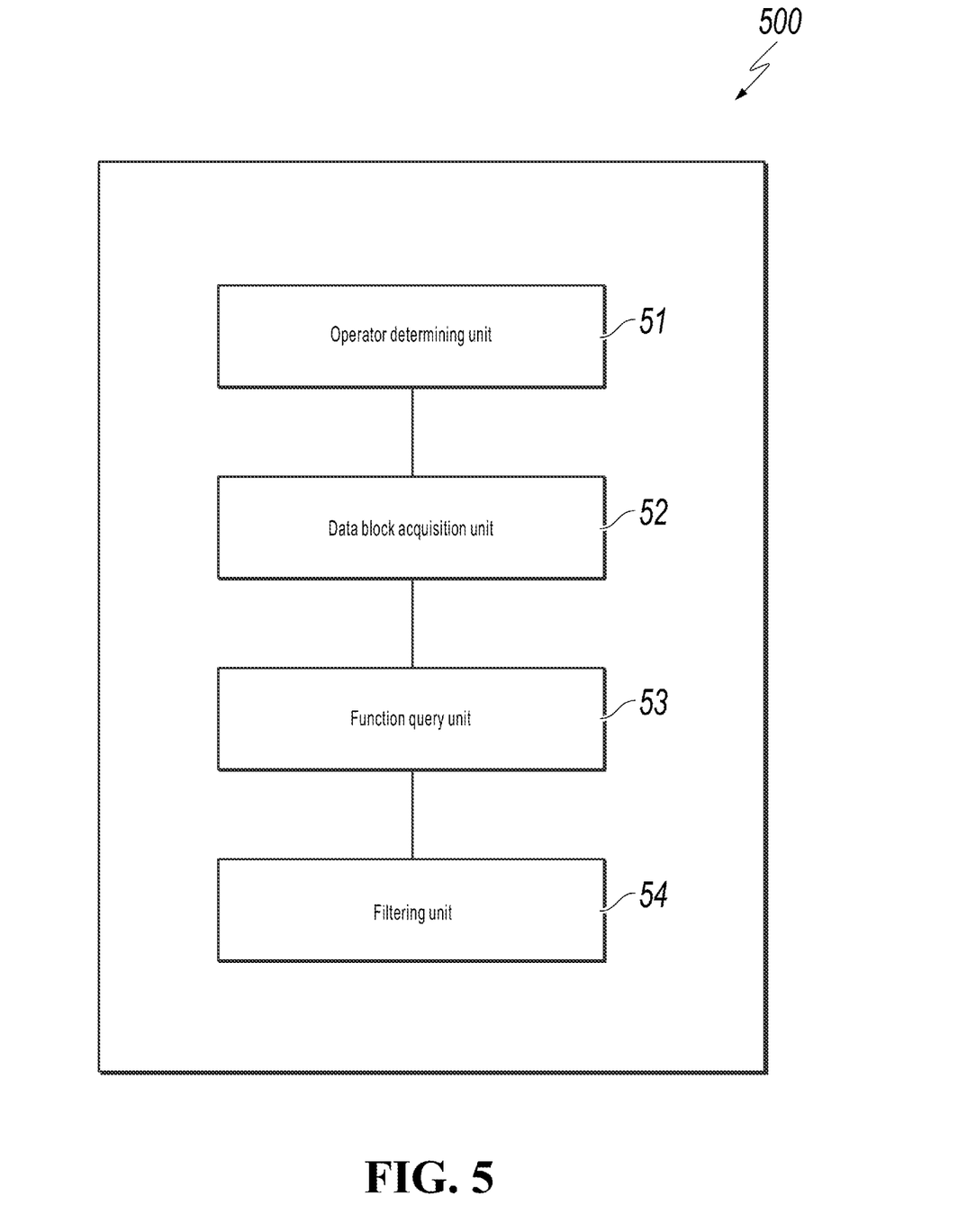
FIG. 5 is a schematic block diagram illustrating a data filtering apparatus according to some embodiments.

According to embodiments in another aspect, corresponding to the data filtering method shown in FIG. 2, this specification further provides a data filtering apparatus for data queries, which is deployed in a target device. The target device serves as a storage node of a database, and the target device can be embodied as any computing unit, server, computer device, or the like that has computing, storage, and processing capabilities. FIG. 5 is a schematic block diagram illustrating a data filtering apparatus according to some embodiments. As shown in FIG. 5, the data filtering apparatus 500 includes the following: an operator determining unit 51, configured to determine a target filtering operator involved in a query; a data block acquisition unit 52, configured to obtain an encoded target data block stored in a target device; a function query unit 53, configured to query a pre-built operator function set by using a data feature and an encoding feature of the target data block to obtain a target execution function of the target filtering operator; and a filtering unit 54, configured to filter the target data block by using the target execution function to obtain a first filtering result.

For details about execution processes of the data filtering apparatus and the units thereof, refer to specific implementation processes of the data filtering method described with reference to FIG. 2. Details are not described again.

According to embodiments in another aspect, a computer-readable storage medium is further provided. The computer-readable storage medium stores a computer program. When the computer program is executed in a computer, the computer is enabled to execute the method processes described above with reference to FIG. 2.

According to embodiments in still another aspect, a computing device is further provided, including a memory and a processor. The memory stores executable code. When executing the executable code, the processor implements the method processes described above with reference to FIG. 2.

A person skilled in the art can realize that, in one or more of the above-mentioned examples, the functions described in this specification can be implemented by hardware, software, firmware, or any combination thereof. When implemented by using software, these functions can be stored in a computer-readable medium or transmitted as one or more instructions or code on a computer-readable medium.

The above-mentioned specific implementations further describe in detail the objectives, technical solutions, and beneficial effects of this specification. It should be understood that the descriptions above are merely specific implementations of this specification and are not intended to limit the protection scope of this specification. Any modifications, equivalent replacements, or improvements made on the basis of the technical solutions of this specification shall fall within the protection scope of this specification.

What is claimed is:

1. A computer-implemented method for data filtering, comprising:
    determining, by a target device serving as a storage node of a database, a target filtering operator involved in a query;
    obtaining, by the target device, a target data block stored in the target device;
    obtaining, by the target device, an operator function set indicating a correspondence between a data feature and an encoding feature of the target data block and a target execution function of the target filtering operator, wherein obtaining the operator function set comprises:
        obtaining a basic function set, wherein the basic function set is generated in a compilation phase of a database program and is applicable to multiple types of hardware platforms;
        in a process of running the database program, obtaining an optimization function set based on a running environment of the target device, wherein the optimization function set is an additional function set compiled based on a compilation environment in the compilation phase, and the optimization function set comprises optimization execution functions of functions in the basic function set; and
        adding the optimization function set to the basic function set to obtain the operator function set;
    querying, by the target device, the operator function set by using the data feature and the encoding feature of the target data block to obtain the target execution function of the target filtering operator; and
    filtering, by the target device, the target data block by using the target execution function to obtain a first filtering result,
    wherein the target filtering operator is pushed down to a storage layer for execution, and wherein the target data block is filtered by using the target execution function when the target data block is in an encoded form.

2. The computer-implemented method according to claim 1, wherein the operator function set is a function set customized based on a hardware platform and the running environment of the target device.

3. The computer-implemented method according to claim 1, wherein the operator function set comprises a function matrix that has multiple dimensions and that corresponds to the target filtering operator; and the multiple dimensions comprise dimensions corresponding to the data feature and dimensions corresponding to the encoding feature; and
    the querying an operator function set to obtain a target execution function of the target filtering operator comprises:
    determining an index value of each of the multiple dimensions based on the data feature and the encoding feature; and
    determining, as the target execution function, a corresponding operator function from the function matrix based on the index value of each of the multiple dimension.

4. The computer-implemented method according to claim 1, wherein the operator function set comprises multiple sub-function matrices corresponding to multiple meta operations; and
    the querying an operator function set to obtain a target execution function of the target filtering operator comprises:
    determining, from the multiple sub-function matrices, target sub-function matrices corresponding to target meta operations involved in the target filtering operator;
    querying each target sub-function matrix based on the data feature and the encoding feature to obtain target sub-functions; and
    determining the target execution function based on a combination of the target sub-functions.

5. The computer-implemented method according to claim 1, wherein
    the data feature comprises one or more of a data type, a data length, or a metadata type; and
    the encoding feature comprises an encoding manner and an auxiliary feature corresponding to the encoding manner.

6. The computer-implemented method according to claim 5, wherein:
    when the encoding manner comprises bitwise data alignment, the auxiliary feature comprises an alignment bit width; or when the encoding manner comprises encoding assisted by a dictionary, the auxiliary feature comprises a related feature of the dictionary.

7. The computer-implemented method according to claim 1, wherein the target data block is a data block in hybrid row/column-oriented storage; the first filtering result indicates a target data row obtained by filtering; and the computer-implemented method further comprises:
obtaining a target data column in an execution plan corresponding to the query;
determining a target data range by using the target data row and the target data column; and
decoding data in the target data range.

8. The computer-implemented method according to claim 1, wherein the first filtering result is in a form of a result bitmap, and the result bitmap indicates, separately by using a first value and a second value, whether a bit belongs to a filtering result.

9. The computer-implemented method according to claim 1, wherein the target device comprises a vector register supporting single instruction, multiple data streams (SIMD); and the target execution function comprises an optimization operation for the SIMD, and the optimization operation comprises:
organizing data based on a vector length of the vector register, and
processing the data based on the vector register by using an instruction set corresponding to a hardware platform of the target device.

10. The computer-implemented method according to claim 1, wherein the target filtering operator relates to a comparison operation; an encoding manner of the target data block is performed based on a dictionary; and an execution path of the target execution function comprises:
searching a dictionary reference table of the dictionary for a reference word corresponding to a target value of the comparison operation; and
in the dictionary reference table, performing comparison processing on an encoding word in the target data block and the reference word.

11. The computer-implemented method according to claim 10, wherein the target filtering operator comprises a comparison operator, an IN operator, or a between operator.

12. The computer-implemented method according to claim 10, wherein the target device comprises a vector register supporting single instruction, multiple data streams (SIMD); and the comparison processing comprises:
performing parallel comparison processing in the dictionary reference table by using the SIMD.

13. A non-transitory, computer-readable medium storing one or more instructions executable by a computer system to perform operations comprising:
determining, by a target device serving as a storage node of a database, a target filtering operator involved in a query;
obtaining, by the target device, a target data block stored in the target device;
obtaining, by the target device, an operator function set indicating a correspondence between a data feature and an encoding feature of the target data block and a target execution function of the target filtering operator, wherein obtaining the operator function set comprises:
obtaining a basic function set, wherein the basic function set is generated in a compilation phase of a database program and is applicable to multiple types of hardware platforms;
in a process of running the database program, obtaining an optimization function set based on a running environment of the target device, wherein the optimization function set is an additional function set compiled based on a compilation environment in the compilation phase, and the optimization function set comprises optimization execution functions of functions in the basic function set; and
adding the optimization function set to the basic function set to obtain the operator function set;
querying, by the target device, the operator function set by using the data feature and the encoding feature of the target data block to obtain the target execution function of the target filtering operator; and
filtering, by the target device, the target data block by using the target execution function to obtain a first filtering result,
wherein the target filtering operator is pushed down to a storage layer for execution, and wherein the target data block is filtered by using the target execution function when the target data block is in an encoded form.

14. The non-transitory, computer-readable medium according to claim 13, wherein the operator function set comprises a function matrix that has multiple dimensions and that corresponds to the target filtering operator; and the multiple dimensions comprise dimensions corresponding to the data feature and dimensions corresponding to the encoding feature; and
the querying an operator function set to obtain a target execution function of the target filtering operator comprises:
determining an index value of each of the multiple dimensions based on the data feature and the encoding feature; and
determining, as the target execution function, a corresponding operator function from the function matrix based on the index value of each of the multiple dimension.

15. The non-transitory, computer-readable medium according to claim 13, wherein the operator function set comprises multiple sub-function matrices corresponding to multiple meta operations; and
the querying an operator function set to obtain a target execution function of the target filtering operator comprises:
determining, from the multiple sub-function matrices, target sub-function matrices corresponding to target meta operations involved in the target filtering operator;
querying each target sub-function matrix based on the data feature and the encoding feature to obtain target sub-functions; and
determining the target execution function based on a combination of the target sub-functions.

16. The non-transitory, computer-readable medium according to claim 13, wherein
the data feature comprises one or more of a data type, a data length, or a metadata type; and
the encoding feature comprises an encoding manner and an auxiliary feature corresponding to the encoding manner.

17. An apparatus serving as a storage node of a database, comprising:
one or more processors; and
one or more computer memory devices interoperably coupled with the one or more processors and having tangible, non-transitory, machine-readable media storing one or more instructions that, when executed by the one or more processors, perform one or more operations comprising:

determining a target filtering operator involved in a query;

obtaining a target data block stored in the apparatus;

obtaining an operator function set indicating a correspondence between a data feature and an encoding feature of the target data block and a target execution function of the target filtering operator, wherein obtaining the operator function set comprises:

obtaining a basic function set, wherein the basic function set is generated in a compilation phase of a database program and is applicable to multiple types of hardware platforms;

in a process of running the database program, obtaining an optimization function set based on a running environment of a target device, wherein the optimization function set is an additional function set compiled based on a compilation environment in the compilation phase, and the optimization function set comprises optimization execution functions of functions in the basic function set; and adding the optimization function set to the basic function set to obtain the operator function set;

querying the operator function set by using the data feature and the encoding feature of the target data block to obtain the target execution function of the target filtering operator; and filtering the target data block by using the target execution function to obtain a first filtering result, wherein the target filtering operator is pushed down to a storage layer for execution, and wherein the target data block is filtered by using the target execution function when the target data block is in an encoded form.

18. The apparatus according to claim 17, wherein the operator function set is a function set customized based on a hardware platform and the running environment of the apparatus.

19. The apparatus according to claim 17, wherein the apparatus comprises a vector register supporting single instruction, multiple data streams (SIMD); and the target execution function comprises an optimization operation for the SIMD, and the optimization operation comprises:

organizing data based on a vector length of the vector register, and processing the data based on the vector register by using an instruction set corresponding to a hardware platform of the apparatus.

* * * * *